United States Patent
Meinzinger et al.

(10) Patent No.: US 9,493,278 B2
(45) Date of Patent: Nov. 15, 2016

(54) PENETRABLE PLASTICS MATERIAL SEAL FOR SEALING CONTAINERS

(71) Applicant: KRONES AG, Neutraubling (DE)

(72) Inventors: Rupert Meinzinger, Kirchroth (DE); Michael Neubauer, Ubersee (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 14/379,849

(22) PCT Filed: Feb. 25, 2013

(86) PCT No.: PCT/EP2013/053722
§ 371 (c)(1),
(2) Date: Aug. 20, 2014

(87) PCT Pub. No.: WO2013/124483
PCT Pub. Date: Aug. 29, 2013

(65) Prior Publication Data
US 2015/0344195 A1     Dec. 3, 2015

(30) Foreign Application Priority Data
Feb. 24, 2012  (DE) .................. 10 2012 101 509

(51) Int. Cl.
| | |
|---|---|
| *B65D 41/02* | (2006.01) |
| *B65D 41/20* | (2006.01) |
| *B65D 51/18* | (2006.01) |
| *B65G 65/00* | (2006.01) |
| *B65D 43/02* | (2006.01) |

(52) U.S. Cl.
CPC ........... *B65D 43/0202* (2013.01); *B65D 41/20* (2013.01); *B65D 51/185* (2013.01); *B65G 65/00* (2013.01); *B65D 2231/022* (2013.01); *B65D 2251/0031* (2013.01); *B65D 2251/0078* (2013.01); *B65D 2543/00953* (2013.01); *B65G 2201/0235* (2013.01)

(58) Field of Classification Search
CPC ............. B65D 43/02; B65D 43/0202; B65D 543/00953; B65D 2543/00953; B65G 65/00; B65G 2201/0235
USPC ................... 220/265, 267, 258.4, 277, 89.3; 215/247, 297; 604/403, 411, 412, 413, 604/414
See application file for complete search history.

(56) References Cited

U.S. PATENT DOCUMENTS

| | | | | |
|---|---|---|---|---|
| 5,143,236 A | * | 9/1992 | Gueret | ................. B65B 31/047 215/247 |
| 5,806,699 A | * | 9/1998 | Ekkert | ............... B29C 45/2628 215/232 |

(Continued)

OTHER PUBLICATIONS

Office Action dated Feb. 15, 2016 issued by the EPO.

*Primary Examiner* — Robert J Hicks
*Assistant Examiner* — Kareen Thomas

(57) ABSTRACT

Plastics material seal (1) for containers (10), comprising a receiving region, for receiving an opening portion (10a) of a plastics material container, and comprising a puncturing region (2), which is suitable for being and intended to be penetrated by a piercing means in a predetermined piercing direction (L), this puncturing region (2) being arranged on a lid surface (1a) of the plastics material seal. According to the invention, the plastics material seal (1) comprises a reinforcing means (20), which is arranged offset from the puncturing region (2) in the piercing direction and which is suitable for increasing a force which counteracts the piercing means through the puncturing region (2) during the piercing process, the plastics material seal (1) advantageously being formed in a single part.

19 Claims, 3 Drawing Sheets

(56) References Cited

U.S. PATENT DOCUMENTS 5,902,298 A * 5/1999 Niedospial, Jr. ...... A61J 1/2089
  215/247

7,607,555 B2 * 10/2009 Smith .................. B65D 77/067
  215/257
8,387,811 B2 * 3/2013 Livingston .......... B01L 3/50825
  215/247

* cited by examiner

PENETRABLE PLASTICS MATERIAL SEAL FOR SEALING CONTAINERS

The present invention relates to a seal for sealing containers and in particular to a single-use plastics material seal. Various containers with different seals are known in the art. Generally, these are seals which seal containers and which can be removed so as to access the container contents.

The present invention relates in particular to containers which are emptied in commercial or privately used dispensing systems. Therefore, the present invention is also intended In particular for use in taprooms.

DE 10 2007 054 431 discloses a method for withdrawing liquids. In this context, a container is crushed as much as possible, by folding the rim thereof in the longitudinal direction, in such a way that virtually the entire container contents can be removed. The subject matter of this application is hereby also incorporated into the subject matter of the present application in its entirety by reference. Various modes of operation are known for opening the container. It is thus possible for the containers to be provided with a special seal, which in turn is opened by a special opening element, even before being installed in a tap system.

The present invention relates in particular to devices in which the seal itself is punctured so as to access the foodstuff.

Large containers in a bar (known as kegs) and large containers in private use, for example family packs having a volume of 2 liters, 3 liters or more in the form of PET bottles, have long been known. In the private field, large containers of this type are generally emptied into drinking glasses without supplementary tools, in such a way that the corresponding container generally merely consists of the container itself and a conventional screw seal, and they thus form a very cost-effective packaging variant.

However, the larger the volume capacity of the container, the more favourable the ratio of the packing costs to volume of drink is as well. In a (professional) bar, however, the volumes are in the range from under 20 liters to over 50 liters. These containers, known as keg barrels, are generally sold in a reuseable system, since the connection technology is complex and expensive. This connection technology is required so as also to keep the drink constantly fresh. This is not the case in the family pack, from which drinks are not taken. In this case, after a while the $CO_2$ escapes from the drink and it tastes flat. The shelf life is also greatly reduced in the absence of $CO_2$.

The complex connection technology relates to the container comprising a connecting valve in the seal, since this means that the connecting valve has to be cleaned and filled through. Special machines are also required for this purpose. However, the connecting mechanism itself, known as the tap head, has to be cleaned and maintained by the dispensing system operator in a complex manner. In particular, with this connection technology, not only the container itself makes its presence felt, in other words the keg barrel itself and the seal thereof (known as the keg fitting), but also the connecting mechanism, in other words what is known as the tap head.

It is also known to use PET containers (as in the aforementioned family pack, but larger, in other words in volumes of under 20 liters, 30 liters and even over 40 liters) for a commercial bar. In these containers, it is attempted to imitate the reuseable barrels in a cost-effective manner for the connection, so as to provide a single-use system. In this context, these seals having a valve function comprise a plurality of components (in particular a riser tube, a seal, a housing, a spring etc.). However, this makes the seal more expensive, since a plurality of parts are provided, the parts have to be assembled, and in addition a plan also has to be provided for assembling these parts. In addition, different materials also have to be recycled.

The object of the present invention is therefore to provide a seal which is configured in such a way that, in particular in the case where this seal is pierced, sealing off from the respective puncturing element, for example a piercing tube, is still provided. This object is achieved according to the invention by the subject matter of claim 1.

Advantageous embodiments and developments form the subject matter of the dependent claims.

A seal according to the invention, and in particular a plastics material seal for containers, in particular plastics material containers, comprises a receiving region, for receiving an opening portion of a plastics material container, and a puncturing region, which is suitable for being and intended to be penetrated by a piercing means in a predetermined piercing direction. In this context, this puncturing region is arranged on a lid surface of the plastics material seal.

According to the invention, the plastics material seal comprises a reinforcing means, which is arranged offset from the puncturing region in the piercing direction and which is suitable for increasing a force which counteracts the piercing means through the puncturing region during the piercing process. In this context, the plastics material seal is advantageously in the form of a single-use product.

Preferably, the plastics material seal is also formed in a single part. As stated, the seal is advantageously a plastics material seal. However, it would also be possible for the seal to be made of another material such as a metal or even a compound.

It is therefore proposed to configure a seal in such a way that in particular, although the piercing surface can be penetrated comparatively easily, on the other hand there is reliable sealing off from the piercing body. This reliable sealing effect is brought about in particular by the counter force which is achieved by the reinforcing means and which loads the puncturing region counter to the force acting thereon. In this way, it can be provided that the piercing region is positioned more tightly against the puncturing body or piercing means. Preferably, however, in this context the reinforcing means is arranged in such a way that it does not itself impede the piercing or the introduction of the piercing means.

In this context, this reinforcing means may itself be formed in a single part or piece. It would also be conceivable for this reinforcing means to be formed in a plurality of parts and/or to be composed of a plurality of elements. Thus, the reinforcing means could for example comprise a material thickening. In addition, the reinforcing means could also comprise a plurality of elements which increase the aforementioned counteracting force. Initially, it may actually seem strange to increase the force counteracting the piercing process intentionally. However, the Applicant has found that this additional force for the piercing process is worthwhile if it results in an improved sealing effect when the piercing element is introduced.

In this context, the reinforcing means may comprise a plurality of wall portions which extend in different directions. Thus, a wall portion of this type could also extend in a longitudinal direction of the container and/or be formed peripherally. It is advantageous for the reinforcing means to comprise or consist of a plastics material. Preferably, the reinforcing means is formed in such a way that the aforementioned counter force is at least also provided by way of the reinforcing means or an element of the reinforcing means cooperating with a portion of the container, and in particular a portion of the opening of the container.

Preferably, this is a seal, in particular formed in a single part, which is configured, simply in terms of the shape thereof, in such a way that it seals itself against the puncturing device during the piercing. In this way, the seal is similarly simple, in terms of production, to seals on standard packs or family packs, and this seal is thus equally particularly favourable even for serving drinks (in particular professionally).

Preferably, a corresponding packaging unit comprises a single-part seal (disclosed herein) and a PET bottle, which is in particular thin-walled. The volume of a PET bottle of this type may for example vary between under 2 liters and over 50 liters. With these different sizes and a cost-effective seal, not only can the export of drinks be facilitated, but serving in the private field can also be favourable, in such a way that the large packaging is actually more favourable than the same volume in small casks.

The material of the plastics material seal advantageously comprises exactly one specific plastics material; however, it would also be conceivable for the material to comprise a plurality of material components and for it also to comprise different material components in different portions of the plastics material seal.

In a further advantageous embodiment, the puncturing region also comprises a radial centrepoint of the seal. It is therefore advantageous for the piercing means to pierce into a central region of the seal during use.

In a further advantageous embodiment, the plastics material seal is formed free of material in a projection direction along the piercing direction apart from the piercing region. This means that the piercing means merely has to penetrate the piercing region, and need not penetrate further regions of the plastics material seal subsequently or beforehand, for example. This also facilitates the piercing process through the plastics material seal.

In a further advantageous embodiment, the piercing material differs from a region of the plastics material seal surrounding this puncturing region in terms of at least one physical property. It is advantageous for this to be a property characteristic of the material (in particular the plastics material), such as material thickness and the like. Preferably, the puncturing region differs from a region directly enclosing it. It is advantageous for this region enclosing the puncturing region to be directly adjacent to the puncturing region, and it is particularly preferably in a connection therewith which is in particular peripheral and preferably also closed.

In a further advantageous embodiment, this property characteristic of the material or this physical property is selected from a group of properties including the wall thickness of the material, the hardness of the material, the presence of reinforcing elements, such as in particular but not exclusively reinforcing ribs, the configuration of reinforcing elements, such as in particular but not exclusively reinforcing ribs, the presence of further material components, combinations of these and the like. In this way, it is possible for the puncturing region itself to be relatively easy for the piercing means to tear through. It is advantageous for the puncturing region not to comprise any reinforcing elements such as reinforcing ribs.

In a further advantageous embodiment, the plastics material seal comprises a first wall element, which can be positioned radially externally on an opening portion of the container. This means in particular that when the container is sealed the aforementioned wall element is positioned radially externally on the aforementioned opening region of the container. It is advantageous for this wall element to be positioned peripherally on the opening portion of the container. In this context, "radially externally" is understood to mean that the wall element is positioned radially on the outside (of the opening) with respect to a longitudinal direction of the container.

In a further advantageous embodiment, the plastics material seal comprises a second wall element, which can be positioned radially internally on an opening portion of the container. It is advantageous for this second wall element also to be formed peripherally. In a further advantageous embodiment, this second wall element is braced with respect to the container (in particular at least when the puncturing region is loaded). This second wall element thus increases the counter force which counteracts the piercing means.

It is advantageous for the two wall elements to be formed in such a way that they receive the opening region of the container between them.

In a further embodiment, the plastics material seal comprises a third wall element, which can be positioned on an (upper) opening rim of the container (in particular by a movement in the piercing direction or in the longitudinal direction of the container). It is advantageous for this third wall element also to determine how far the seal is placed onto the container.

In a further advantageous embodiment, the plastics material seal comprises at least one thread. This thread is in particular an internal thread, which can particularly preferably be screwed onto a corresponding external thread of the container.

The seal disclosed herein has in particular the advantage of very simple operation, but also very simple production. The operation is also facilitated in the context of carbon dioxide $CO_2$ rinsing or in the context of closing the container. This seal further has advantages during the subsequent recycling of the container. Cleaning and maintenance of the connection mechanism are also unnecessary, or can be made significantly easier.

Further, better oxygen values can also be achieved with a lower $CO_2$ consumption during rinsing.

In a further advantageous embodiment, the reinforcing element is arranged under the puncturing region, or closer to the container or to the liquid arranged in the container when the plastics material seal is placed on the container.

In a further advantageous embodiment, the plastics material seal further comprises a seal-up element. In this context, this seal-up element can be above the puncturing region, for example glued onto this puncturing region. By means of this sealing up, any soiling on the connection point or the puncturing region can be removed. However, it is advantageous for this seal-up element to be configured in such a way that if it has not been removed the sealing up can also be penetrated as well without difficulty. It is therefore advantageous for the seal-up element to be formed in such a way that it can also be penetrated by the piercing means.

In a further advantageous embodiment, the plastics material seal is to be operated like a conventional seal.

In a further advantageous embodiment, the container seal comprises a separate sealing edge. In this context, this sealing edge may for example be arranged on the puncturing region or on a lid surface of the seal, and be able to be positioned on this piercing device, in particular peripherally, after piercing by a piercing device. This is explained more precisely with reference to the drawings. Instead of a peripheral sealing edge, it would also be possible to provide a plurality of small edges or sealing lips. In this context, it would also be possible for these sealing edges or sealing lips also to be reinforced by the reinforcing means, so as to improve the pressing effect on a piercing means.

In this context, it is in principle possible for sealing edges or sealing aids of this type to be arranged both on the outside of the seal and on the inside thereof. In addition, these sealing aids may be both raised and depressed (in each case as considered with respect to the container). Preferably, the sealing edges are arranged on an internal edge of the seal or the cover surface thereof and preferably project into the interior of the container.

As stated, the plastics material seal for the container may be in the form of a screw seal or snap-on lid.

In a further advantageous embodiment, it is also possible for an adapter further to be provided between the seal and the connection point of the container, on the one hand, and the container opening, on the other hand, so as to make the seal itself as small as possible.

In a further advantageous embodiment, it is possible for the opening, the aforementioned adapter or even the seal itself to be in the form of screw or snap-on connections. Combinations of the types of connection are also conceivable.

It is possible to seal the seal towards the opening of the container or else towards said optional adapter in a conventional manner, for example using a lip or a double lip, with external or internal sealing, in the form of an O-ring or a flange, or the like.

Preferably, the puncturing region is formed inside a cavity placed in the lid wall of the plastics material seal.

The present invention further relates to a plastics material container comprising a plastics material seal of the type mentioned above. As stated previously, the basic idea of this invention is to provide a seal or a valve function which comprises a special region for penetration. In this context, this connection point for the penetration, in other words the aforementioned puncturing region, need not be directly identifiable, since it is advantageous for this point merely to differ from the remainder of the seal by way of the different properties. This puncturing region may, as stated above, be distinguished by different wall thickness, different material hardness, or the absence of reinforcing ribs, further material components (in one or more parts) and the like.

In a particularly preferred embodiment, a seal is provided which is conventional per se and comprises the aforementioned puncturing region, in particular if the connection mechanism is adapted accordingly. However, for this purpose the aforementioned compromises or measures are preferably taken so as to ensure tightness during the puncturing process and so as advantageously also to keep the puncturing force sufficiently small that the seal does not buckle away.

For the seals found in conventional commercial drinks bottles, for example having a size of 28 mm, the penetration can be carried out in a desirable manner. Further, penetration without a special puncturing region is still conceivable up to a seal diameter of up to approximately 38 mm and potentially even somewhat more, but at the size required in particular in the professional field it is advantageous to configure a position or puncturing region as disclosed above.

Generally, seals of this type are made sufficiently stable that they withstand the internal pressure of the high-volume container, so as to provide that a surface which is not specially produced cannot also be penetrated and sealed in this manner.

It is advantageous for the containers which are to be sealed in this manner to be single-use containers, which can also be used in particular as a replacement for the reuseable steel barrels currently known on the market. However, it would also in principle be possible to arrange the seal according to the invention on a reuseable barrel. The seal is also suitable for home dispensing, in particular if the container volume is approximately 5 liters.

The present invention further relates to a container and in particular to a plastics material container. According to the invention, this container is sealed using a plastics material seal of the type disclosed above. It is advantageous for this container to be filled with a flowable medium, preferably with a liquid and particularly preferably with a drink. However, the liquid could also be a viscous liquid. It is advantageous for the plastics material seal to be arranged releasably on the container. It is advantageous for the plastics material seal to engage around an opening of the container.

The present invention further relates to a method for handling containers using a plastics material seal of the type disclosed above. It is advantageous for the handling to be selected from a group of types of handling including sealing the container, storing the container, transporting the container, taping the container, drawing liquid from the container, filling the container and the like.

It is advantageous for the handling of the container to be drawing liquid from the container. It is advantageous for the plastics material seal to be penetrated by a drawing means for the purpose of drawing liquid from the container. It is advantageous for the plastics material seal to be deformed at least in portions for the purpose of drawing liquid from the container.

Further advantages and embodiments may be taken from the appended drawings, in which.

Figure 1:
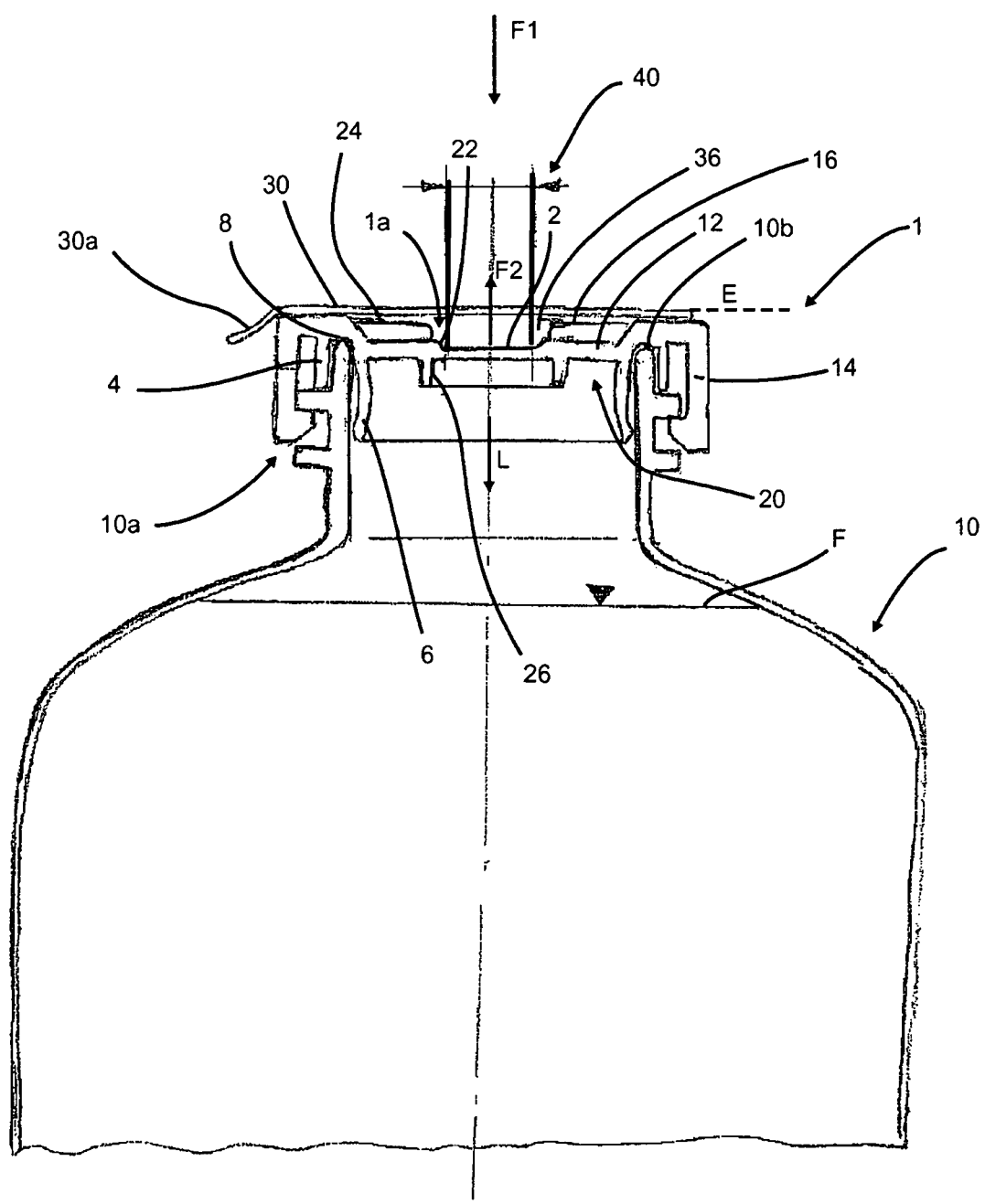
FIG. 1 shows a container comprising a seal according to the invention of a first embodiment.

FIG. 1 shows a container 10 on which a seal 1 according to the invention of a first embodiment is arranged. In this context, this seal 1 comprises a piercing region 2, into which a piercing means (only show schematically) can pierce. For this purpose, the piercing region 2 is penetrated and the piercing means 40 is introduced further into the container 10, for example until the lower end of the piercing means 40 is positioned entirely beneath the liquid level F within the container 10. Reference sign L denotes a piercing direction for the piercing means 40. In this case, this piercing direction coincides with the longitudinal direction L of the container.

Reference sign 12 denotes a region, enclosing the piercing region 2, of the plastics material container 10. It can be seen that this enclosing region 12 is formed with thicker walls than the piercing region 2 itself. A transition portion 22 is arranged between the piercing region 2 and the region 12 enclosing this piercing region 2.

In addition, a further region 24 (as a further reinforcement) enclosing the piercing region may further be provided.

It can be seen that the puncturing region is thus formed with thinner walls than other regions of the plastics material seal 1.

Reference numeral 30 denotes a seal-up means, such as a metal foil, which is arranged above the seal 1. As stated, this foil may be formed in such a way that it can also be penetrated by the piercing means 40. Reference numeral 30a denotes a pull-off element for pulling off the seal-up means.

A first wall element 4 (in this case formed peripherally) is positioned on the outside of the container opening 10a. A second wall element 6 is positioned on the inside of the opening portion 10a of the container 10. In this context, in this case the peripheral opening is received in portions between these two wall elements 4, 6. The second wall element 6 simultaneously contributes to the reinforcement. When the piercing means 40 is placed on the puncturing region 2, it bends downwards at least slightly under the action of the force, and thus the second wall element 6 is also urged onto the inner opening rim of the opening 10a. This in turn results in a counter force F2 on the enclosing region 12 and thus also on the puncturing region 2, specifically in a direction counter to the direction L.

Reference numeral 20 denotes as a whole the reinforcing means for reinforcing the puncturing region. In this case, when the piercing means 40 pierces or is introduced, this reinforcing means 20 causes this piercing movement to be countered by a counter force. In this case, this counter force is also produced in that the wall elements are pressed outwards against the inner wall of the opening of the container.

Reference numeral 8 denotes a third wall element which is positioned upwardly on the opening 10a of the container, more precisely on an upper opening rim 10b.

It can further be seen that the puncturing region 2 is lowered with respect to a lid plane E of the seal 1 or is arranged in a recess or cavity which is denoted as 36 as a whole. Reference numeral 26 denotes a sealing element (in this case in the form of a web), which in this case is arranged projecting inwards, in other words towards the container, and can be placed for example on the piercing means 40. In particular, the arrangement shown also leads to increased stability outside the puncturing region. Preferably, this sealing element is also a component of the reinforcing means, and thus counters the piercing movement at least during the piercing process. In this way, a greater sealing effect is achieved, making the greater force when piercing worthwhile.

The seal further comprises a further outer peripheral wall 14, which in this case can engage a region of the opening 10a of the container from behind. Thus, in the embodiment shown in FIG. 1, the seal 1 is in the form of a snap-on lid. Reference numeral 1a denotes a lid surface of the seal 1. In this context, this lid surface preferably also comprises the puncturing region 2. In this context, the cover surface may be formed planar; however, a funnel-shaped formation of this cover surface would also be possible.

Figure 2:
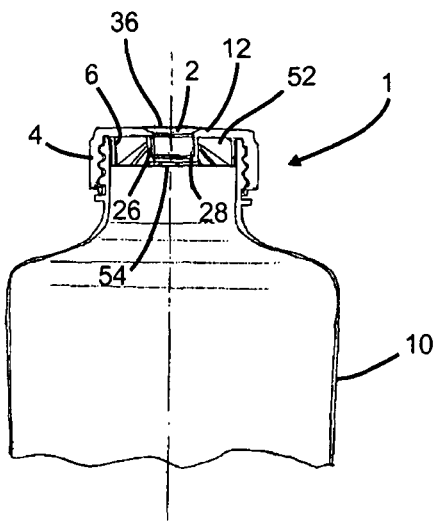
FIG. 2 shows a container comprising a seal of a second embodiment.

FIG. 2 shows a further embodiment of a plastics material seal 1 according to the invention. A peripheral first wall element 4 is also formed, and is positioned against the outside of the container opening. In this case, this peripheral wall element 4 is simultaneously also formed with a thread function, in such a way that the seal as a whole can be screwed onto the container 10. In this case, the second wall element 6 is likewise formed peripherally.

In this case, the piercing region 2 and the environment adjacent to this piercing region 2 can again be seen. In this case too, the piercing region is again arranged in a cavity or recess 36. Further, in this case too, a web 26 extended upwards and downwards is shown, on which a peripheral sealing lip 28 is arranged in this case. The web 26 is thus also part of the sealing element.

Reference numeral 52 denotes a peripheral reinforcing web, which in turn causes the wall 6 also to be pressed against the internal wall of the container opening 10a when the puncturing region 2 is penetrated. In this case, this reinforcing web 52 is again part of the reinforcing means denoted as 20, which brings about the aforementioned counter force counter to the piercing direction.

Figure 3:
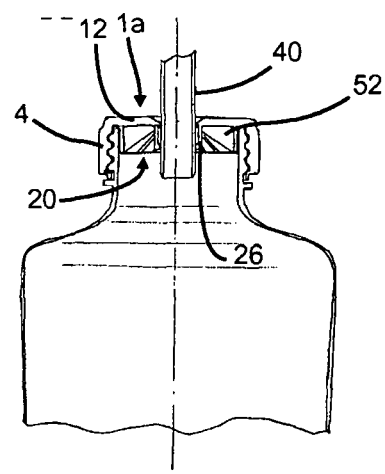
FIG. 3 shows the seal from FIG. 2 with the piercing means introduced.

FIG. 3 shows the container seal from FIG. 2, but with the piercing means introduced. It can be seen that in this case the peripheral sealing lip is positioned peripherally on the piercing means and further seals it. In this embodiment too, it would be possible for no further material to be provided on the path of the piercing means apart from the puncturing region. However, in this case it is advantageous for a further, lower wall 54 (FIG. 2) to be provided, which is likewise penetrated by the piercing means 40.

Figure 4:
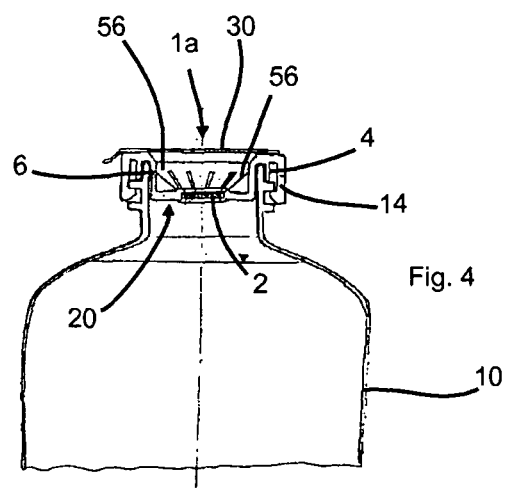
FIG. 4 shows a container comprising a seal of a third embodiment.

FIG. 4 shows a further embodiment of a plastics material seal according to the invention. This embodiment is broadly similar to the embodiment shown in FIG. 1 as regards the application of the plastics material seal to the container. However, in this embodiment the piercing region is displaced further inwards and reinforced by way of a funnel-shaped reinforcing body 56, which in this case forms the reinforcing means. In this case too, this funnel-shaped reinforcing body causes an appropriate counter force to be exerted during piercing into the puncturing region. By contrast with what is shown in FIGS. 1 and 4, this seal could also be in the form of a screw seal. In this case, the entire piercing region 2 may also be in the form of a material composite, in other words an element comprising two different materials. Reliable sealing can equally be provided in this manner.

Figure 5:
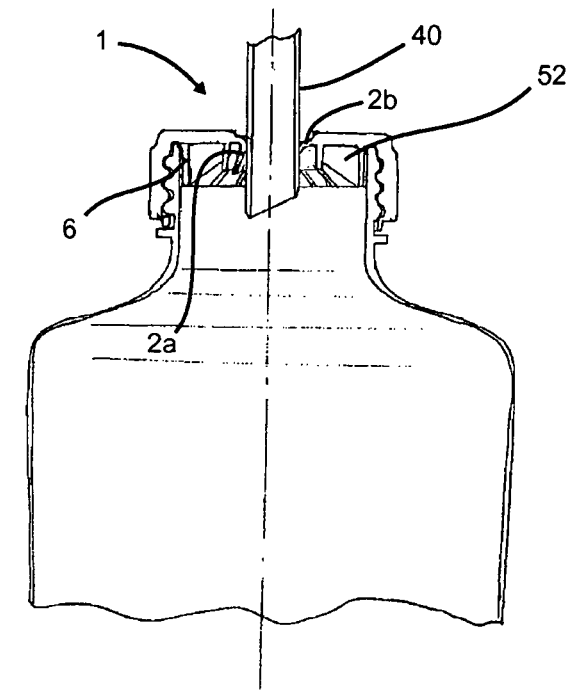
FIG. 5 shows a container comprising a seal of a fourth embodiment.

FIG. 5 shows a further embodiment of a plastics material seal according to the invention. This embodiment is similar to the embodiments shown in FIGS. 2 and 3. However, in this case the sealing effect is ensured by the puncturing region 2 alone. In this context, in this case the piercing means is formed in such a way that it does not completely cut out the piercing region, but leaves a particular proportion 2a of the piercing region on the seal. This region 2a does not impede the drawing of the liquid. It can further be seen that during piercing a further portion 2b is produced which simultaneously provides sealing off from the piercing means 40. In this case, the seal 1 shown in FIG. 5 is in the form of a screw seal; however, formation as a snap-on lid would also be conceivable. Reference numeral 52 again denotes the reinforcing element, which serves to reinforce the puncturing region and which increases the sealing effect of the seal from the piercing means even after the piercing by the piercing means.

Figure 6:
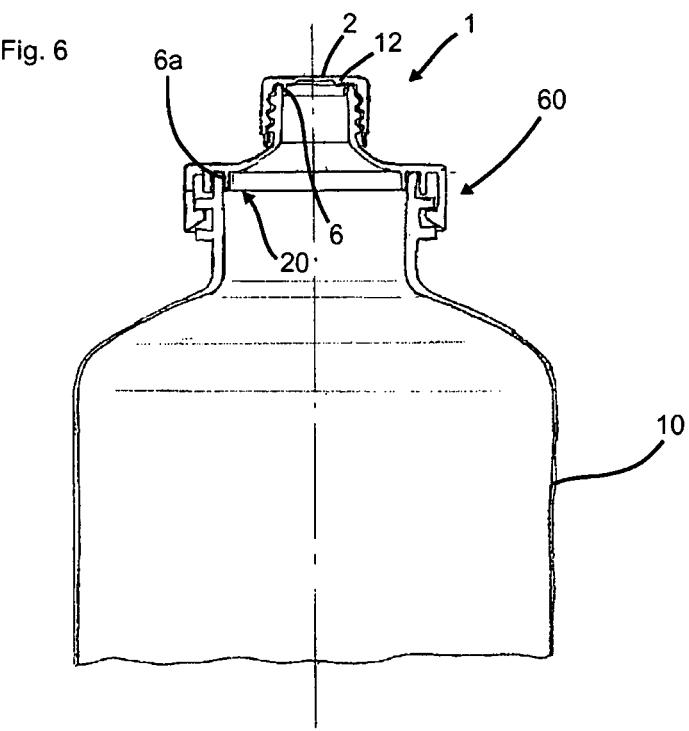
FIG. 6 shows a container comprising a seal of a fifth embodiment.

FIG. 6 shows a further embodiment of a seal 1 according to the invention. In this embodiment, the seal is formed in two parts, and also comprises an adapter element 60, which is this case is snapped open onto the container. A possibly conventional seal is in turn screwed onto this adapter element 60. This variant has the advantage of using conventional seals, which in turn can be placed on or screwed onto an adapter element, which need not necessarily be formed as a single-use product.

In this embodiment, it is advantageous for the adapter element (also) to be configured in such a way that it can counteract the piercing force. In this case, the adapter element 60, which in this case may also be part of the seal as a whole, comprises an inner wall element 6a, which can apply this counter force. Nevertheless, in this case the upper part of the seal 1 also comprises the puncturing region 2 and the region 12, which encloses this puncturing region and in this case simultaneously serves as a reinforcing element and likewise comprises an inner wall element 6. The advantage of the embodiment shown in FIG. 6 is that the seal 1 to be penetrated can itself be produced with smaller diameters. In this embodiment, the adapter element 60 thus also takes on the function of the aforementioned reinforcing means.

The Applicant reserves the right to claim all of the features disclosed in the application documents as essential to the invention wherever they are novel over the prior art individually or in combination.

LIST OF REFERENCE NUMERALS

1 Plastics material seal
1a Lid surface
2 Piercing region
2a Specific proportion of the piercing region
2b Further region produced during piercing
4 First wall element
6 Second wall element
6a Second wall element of the adapter element
8 Third wall element
10 Container
10a Container opening
10b Opening rim
12 Region enclosing the piercing region
14 Outer peripheral wall
20 Reinforcing means
22 Transition portion
24 Further region enclosing the piercing region
26 Web, sealing element
28 Sealing lip
30 Seal-up means
30a Pull-off element
36 Recess, cavity
40 Piercing means
52 Peripheral reinforcing web
54 Lower wall
56 Funnel-shaped reinforcing body
60 Adapter element
E Lid plane
F Liquid level
L Piercing direction
F1, F2 Forces

The invention claimed is:

1. A plastics material seal (1) for containers (10), comprising a receiving region for receiving an opening portion (10a) of a plastics material container, and comprising a puncturing region (2), which is suitable for being and intended to be penetrated by a piercing means in a predetermined piercing direction (L), this puncturing region (2) being arranged on a lid surface (1a) of the plastics material seal,
wherein
the plastics material seal (1) comprises reinforcing ribs (20), which are arranged offset from the puncturing region (2) in the piercing direction and which are suitable for increasing a force which counteracts the piercing means through the puncturing region (2) during the piercing process, the plastics material seal (1) advantageously being formed in a single part and wherein a sealing effect is brought about by a counter force which is achieved by the reinforcing ribs (20) and which loads the puncturing region (2) counter to the force acting thereon and provides that the puncturing region (2) is positioned more tightly against the piercing means, and wherein the reinforcing ribs are arranged under the puncturing region (2).

2. The plastics material seal (1) according to claim 1, wherein the plastics material seal is formed free of material in a projection direction along the piercing direction (L) apart from the piercing region.

3. The plastics material seal (1) according to claim 1, wherein the puncturing region (2) differs from a region of the plastics material seal surrounding this puncturing region (2) in terms of at least one property characteristic of the material.

4. The plastics material seal (1) according to claim 1, wherein the property characteristic of the material is selected from a group of properties including the wall thickness of the material, the hardness of the material, the presence of reinforcing ribs, the configuration of reinforcing ribs, the presence of further material components and combinations of these.

5. The plastics material seal (1) according to claim 1, wherein the plastics material seal comprises a first wall element (4) which can be positioned radially externally on an opening portion of the container (10).

6. The plastics material seal (1) according to claim 5, wherein the plastics material seal comprises a second wall element (6) which can be positioned radially internally on an opening portion (10a) of the container (10).

7. The plastics material seal (1) according to claim 6, wherein the plastics material seal comprises a third wall element (8), which can be positioned on an opening rim (10b) of the container (10).

8. The plastics material seal (1) according to claim 1, wherein the plastics material seal comprises at least one thread (12).

9. The plastics material seal (1) according to claim 1, wherein the reinforcing means is formed peripherally around the piercing region in a projection in the piercing direction.

10. The plastics material seal (1) according to claim 1, wherein the puncturing region is formed within a cavity (36) positioned in a lid wall of the plastics material seal (1).

11. A container (10) for storing liquids, wherein the container is sealed using the plastics material seal according to claim 1.

12. A method for handling containers, wherein the container is handled in a predetermined manner, the handling being selected from a group of handlings including sealing the container, storing the container, transporting the container, taping the container, drawing liquid from the container and filling the container, the container being provided with the plastics material seal (1) according to claim 1.

13. The plastics material seal (1) according to claim 1, wherein the reinforcing ribs (20) comprise a plurality of wall portions which extend in different, directions, wherein a wall portion also extends in a longitudinal direction of the container and/or is formed peripherally.

14. The plastics material seal (1) according to claim 6, wherein the two wall elements (4, 6) are formed in such a way that they receive the opening portion (10a) of the container between them.

15. The plastics material seal (1) according to claim 1, wherein the plastics material seal (1) further comprises a seal-up element (30) which is above the puncturing region (2).

16. The plastics material seal (1) according to claim 15, wherein the seal-up element (30) is formed in such a way that it is also penetrated by the piercing means (40).

17. The plastics material seal (1) according to claim 6, wherein a counter force is also produced in that the wall elements (4, 6) are pressed outwards against the inner wall of the opening of the container (10).

18. The plastics material seal (1) according to claim 1, wherein the seal (1) further comprises a further outer peripheral wall (14) which in this case can engage a region of the opening (10*a*) of the container from behind.

19. A plastics material seal (1) for containers (10), comprising a receiving region for receiving an opening portion (10*a*) of a plastics material container, and comprising a puncturing region (2), which is suitable for being and intended to be penetrated by a piercing means in a predetermined piercing direction (L), this puncturing region (2) being arranged on a lid surface (1*a*) of the plastics material seal, wherein the plastics material seal (1) comprises reinforcing ribs (20), which are arranged offset from the puncturing region (2) in the piercing direction and which are suitable for increasing a force which counteracts the piercing means through the puncturing region (2) during the piercing process, the plastics material seal (1) advantageously being formed in a single part and the plastics material seal (1) comprises a first wall element (4) and a second wall element (6), wherein the two wall elements (4, 6) are formed in such a way that they receive the opening region of the container between them, and wherein the reinforcing ribs are arranged under the puncturing region (2).

* * * * *